April 13, 1937. A. ABRAMS ET AL 2,077,300
PACKAGING CHEESE
Filed March 19, 1936   2 Sheets-Sheet 1
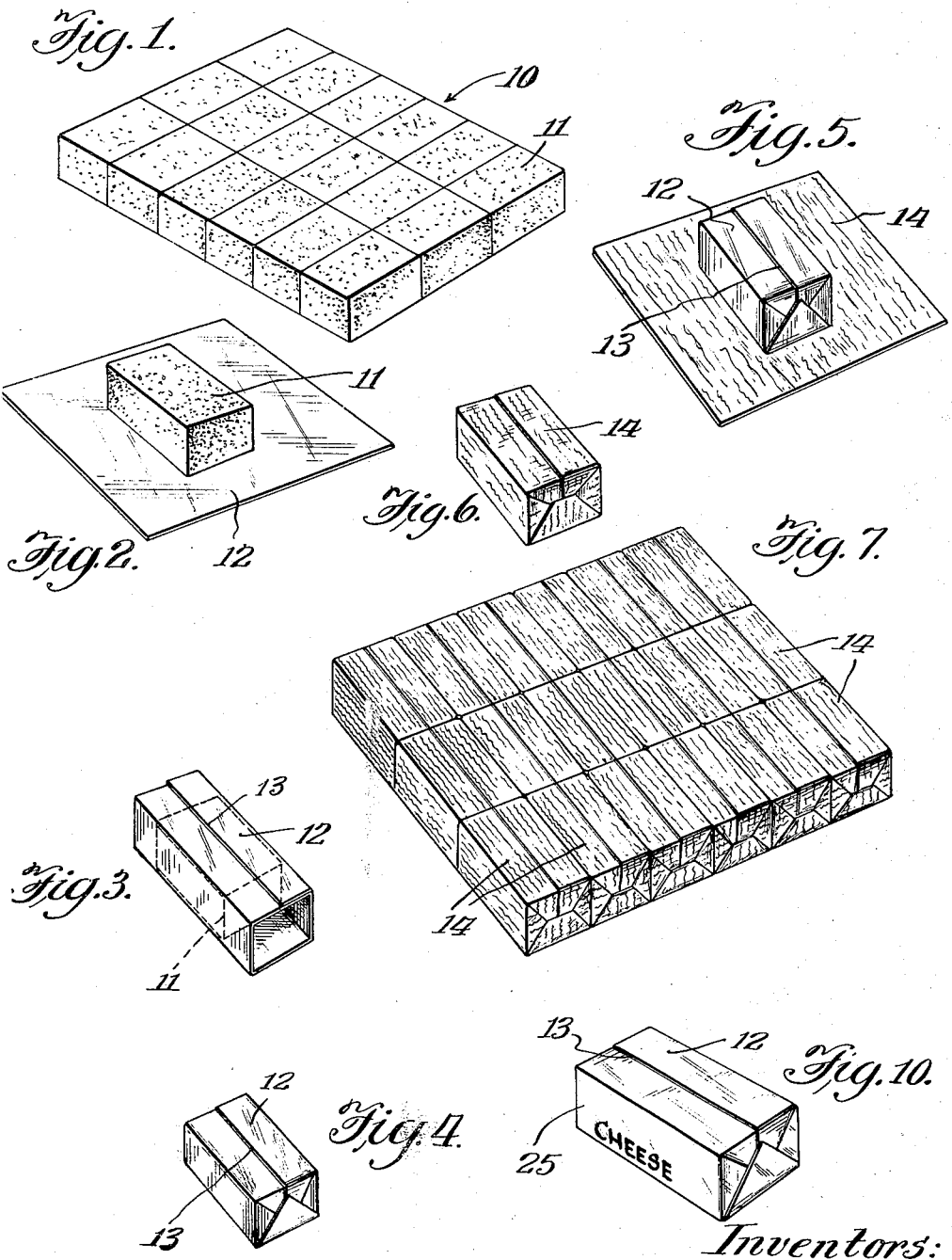

April 13, 1937.  A. ABRAMS ET AL  2,077,300
PACKAGING CHEESE
Filed March 19, 1936   2 Sheets-Sheet 2

Inventors:
Allen Abrams,
Charley L. Wagner
& Benjamin F. Davis.
By Joseph Rossman Atty.

Patented Apr. 13, 1937

2,077,300

UNITED STATES PATENT OFFICE 2,077,300

PACKAGING CHEESE

Allen Abrams and Charley L. Wagner, Wausau, and Benjamin F. Davis, Arena, Wis., assignors to Marathon Paper Mills Company, Rothschild, Wis., a corporation of Wisconsin Application March 19, 1936, Serial No. 69,733

12 Claims. (Cl. 99—178)

This invention relates to a method of packaging and preserving uncured cheese and to a novel package produced thereby.

The sale of natural cheese has been limited to some extent by the fact that it is not possible to package it properly at the time of manufacture. Consequently the cheese is made up in various forms known as Young Americans, Longhorns, Daisies, Cheddars, and the like. These vary in weight from about 10 lbs. to 60 lbs. More recently there have appeared rectangular forms in 2½ and 5 lb. loaves.

All of the foregoing cheese is usually paraffined after manufacture and then allowed to cure. During the curing period the cheese may become mouldy on the surface and, due to drying out, becomes harder and acquires a rind on the outside.

This method of handling cheese is subject to a number of objections. In the formation of the rind there is a considerable loss of moisture, the amount depending on the temperature, time of storage and the size of the cheese package. For example, a 5 lb. unparaffined cheese loaf stored at 40° F. for three days lost approximately 2% moisture. The same loaf, after paraffining, stored at 40° F. for three months, lost an additional 2.0% moisture or a total, from the time of manufacture, of 4.0% moisture. An exactly similar loaf, wrapped according to our invention hereinafter described, lost in the same period only 0.1%.

Another objection to the present method of handling cheese arises from the growth of mold on the surface of the cheese, which must then be removed before marketing.

The methods of distributing natural cheese heretofore in use do not permit of placing in the hands of the ultimate consumer a well protected package which retains the proper moisture, which prevents the growth of mold and which may be identified as to its source of manufacture. According to Decker and Sammis "Cheese Making" (1930) page 248 "A method for the manufacture of a family size American cheese, weighing 1 to 5 lbs. has long been sought. 5 lb. hoops have been made and in a few cases, 1 lb. hoops, but the rind, shrinkage and waste on such small cheese has limited their widespread use. Cheese has been pressed in 100 lb. (or larger) cubes, and after curing cut up with knives into one or two pound blocks, and either paraffined or wrapped in scale board (veneer) for packing and shipment. This secured curing with little shrinkage, but did not wholly avoid a moldy surface on the cheese. 5 lb. blocks of cheese have been wrapped in tin foil and a hot iron applied to the sides to kill mold germs under the foil. 5 lb. blocks cut from a larger cube have been also wrapped in cloth, and repressed in a hoop, so as to produce a perfectly closed rind, to exclude air and mold growth from the interior."

Various other methods have been suggested for packaging natural cheese but in general these have failed to obviate difficulties caused by mold growth and moisture loss; or because the process proved to be impractical or uneconomic in operation.

The object of this invention is therefore to prepare a package of natural cheese which may be made up in small quantities weighing from ½ lb. and upward.

Another object of this invention is to produce a package of cheese free of mold and retaining practically all its original moisture content.

Another object of the invention is to provide a cheese package having a closely adhering flexible, waterproof, moistureproof, pressure sealable sheet applied to the outer surfaces of the cheese.

A further object of this invention is to provide cheese with a wrapper which permits curing or ripening of the cheese therein and at the same time inhibits mold growth.

A further object of the invention is to provide a cheese package having a wrapper which will not impart any deleterious taste or odor to the cheese and which is translucent so as to permit inspection of the contents.

Another object is to provide cheese in small unit weights wrapped with a pressure sealable sheet which may be printed, embossed or otherwise impressed to identify the manufacturer.

A still further object of the invention is to provide a method of preserving and ripening cheese in small units enclosed in a wrapper in which it is sold to the ultimate customer so as to eliminate objectionable rind, waste and shrinkage.

An important object of this invention is to provide a method of packaging natural uncured cheese in small units suitable for direct merchandising to the ultimate consumer.

Other and further objects of the invention will be apparent from the disclosures in the accompanying drawings and following specification.

The invention (in a preferred form) is illustrated in the drawings and hereinafter more fully described.

On the drawings:

Figure 1 represents a large block of cheese cut into smaller pieces or smaller blocks of uniform size.

Figure 2 illustrates the flexible, self sealing wrapper used in combination with the individual smaller blocks of cheese cut from the larger block.

Figure 3 illustrates a step in the wrapping process.

Figure 4 illustrates the completely wrapped block.

Figure 5 illustrates the wrapped block shown in Figure 4 used in combination with a sheet of crepe paper.

Figure 6 illustrates the block completely wrapped in the crepe paper.

Figure 7 illustrates a plurality of the blocks as shown in Figure 6 assembled together prior to the pressing operation.

Figure 10 illustrates a block of cheese wrapped in a self-sealing film having a manufacturer's identification thereon.

Figure 8:
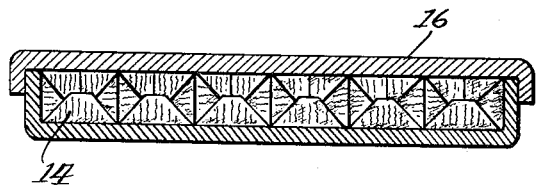
Figure 8 illustrates the blocks placed in a hoop for the pressing operation.

According to our invention we provide a wrapper which may be pressed on to the surface of the cheese and which will thereafter hug the surface tightly, preventing the growth of mold. Moreover the wrapper must be waterproof so that whey from the cheese will not cause it to become wet and disintegrate. The wrapper must be moistureproof to prevent the cheese from losing weight and forming a rind on the surfaces thereof. The wrapper must be flexible so that as the cheese expands or contracts slightly due to drying out or to temperature changes, the wrapper will continue to cling to surface. Moreover in pressing onto the surface of the cheese the wrapper must conform to any irregularities in the cheese surface or those caused by the pressing equipment. The wrapper must also be sufficiently permeable to carbon dioxide gas to permit normal curing of the cheese.

We have discovered that a wrapper which meets the aforementioned requirements can be advantageously made from a wax-rubber sheet or film, preferably comprising at least from about 6 to 30% of rubber, prepared according to copending application Serial No. 693,740, Patent No. 2,054,-112 September 15, 1936 so as to have an initial viscosity of at least 8,000 secs., (50 c.c. measured on a Scott viscosimeter at 90° C.). This film is stretchable, waterproof, moistureproof, flexible, and is self-sealing upon application of pressure to adjacent overlapped surfaces.

Other films having similar pressure self-sealing properties in relation to the cheese may of course be used in place of such wax-rubber films or sheets.

We have found that rectangular shapes are best adapted for ease of manufacture of our package, but round or other shapes may be employed.

In packaging natural American cheese the following procedure is found to be advantageous. Hoops of the proper size should first be provided. For example, a hoop having inside dimensions of 3½" depth, 11" width and 14" length will hold 20 lbs. of natural American cheese which can be cut into the following smaller sizes:

| Number of loaves in hoop | Weight of individual loaf | Dimensions of individual loaf |
| --- | --- | --- |
| 8 | 2½ lbs. | 3½" x 3½" x 5½" |
| 4 | 5 lbs. | 3½" x 3½" x 11 " |
| 2 | 10 lbs. | 3½" x 5½" x 14 " |

When using a hoop inside dimensions of 4⅜" depth, 11" width, 14 1/16" length it is possible to place therein 28 lbs. of natural American cheese which can be cut into the following sizes:

| Number of loaves in hoop | Weight of individual loaf | Dimensions of individual loaf |
| --- | --- | --- |
| 56 | ½ lb. | 1⅜" x 2 1/16" x 4⅜" |
| 28 | 1 lb. | 2¾" x 2 1/16" x 4⅜" |

The curd is weighed into the hoop with about 7% excess curd over the rated capacity of the hoop which is the normal procedure in cheese pressing. For example in a 28 lb. hoop there is placed 30 lbs. of curd. The curd is pressed in the hoop for about ½ hour in order to form a block of green cheese, 10, having the shape of the hoop as illustrated in Figure 1.

The green cheese is then dressed or wrapped in press cloth as is customary in this art, replaced in the hoop and pressed by any of the well known presses for at least 2 hours to close up and eliminate empty spaces in the body of the cheese and remove any entrapped whey. The cheese is then taken from the press and the cloth removed therefrom.

The cheese so produced is next divided or cut into a plurality of smaller cheeses, 11, of predetermined size necessary to obtain the proper tolerance. The individual cheeses are then wrapped in sheets, 12, of wax-rubber of the proper size suitable for completely enclosing each cheese. It is advantageous to use sufficiently large sheets of wax-rubber so that when the cheese is wrapped the edges of the wax-rubber sheet will overlap slightly at the seams as at 13, so that when subsequently pressed the film will self seal to itself and thereby completely seal the cheese at all seams so as to exclude access of air.

In order to ensure complete sealing of the wrapper the packages are replaced in the hoop, 16, as shown in Figure 8 in the same order as when taken out or in any other suitable press if desired. They are then pressed for about 8 to 10 hours under a pressure sufficient to make the film hug the cheese.

In order to prevent rupture of the film during this operation we have found it advantageous to wrap the individual packages with an outer sheet, 14, of dry waxed creped paper as shown in Figures 5 and 6. This paper being somewhat yielding serves to protect the wax-rubber film during the final pressing operation and thereby prevents rupture of the film. This also prevents the pressure-sealing of adjacent packages during pressing. The crepe paper also assists in pressing the film closely against the cheese surfaces thereby forcing the air from between the cheese and the wrapper which escapes through the seams. It is not essential that dry waxed crepe paper be used and any other suitable waterproof wrapper, not permitting mold growth, may be used. The outer wrapper may be removed at any desired time after the pressing operation or the wrapper may be permitted to remain in the final package.

The cheese packages are then removed from the hoops and placed in storage for curing a suitable length of time. We have found a curing temperature between 40 and 65° F. satisfactory. Higher temperatures will cause too rapid curing and tend to produce an oily surface and possible injury of the flavor.

Figure 9:
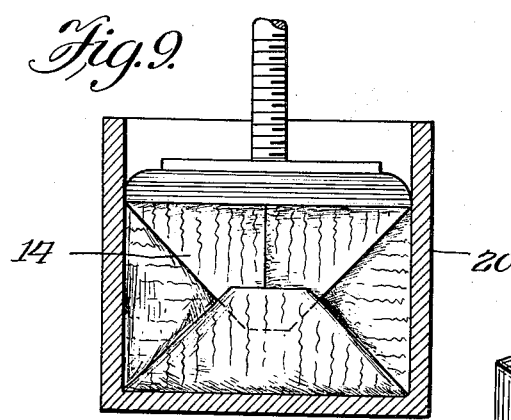
Figure 9 illustrates the block shown in Figure 6 placed in an individual mold.

The invention is not limited to any particular method of pressing the cheese units. If desired the individual cheese units after being wrapped may be pressed in individual molds, 20, as shown in Figure 9 instead of being placed in the hoop as described.

Figure 13:
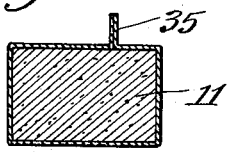
Figure 13 is a cross-sectional view of a cheese block wrapped by another method.
Figure 14:
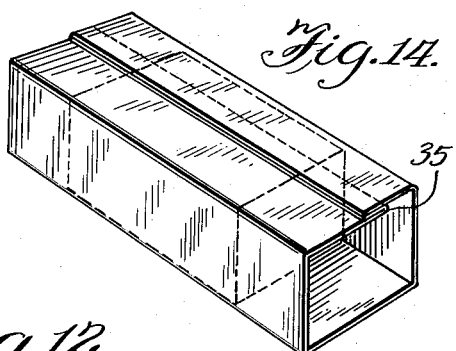
Figure 14 illustrates the next step of wrapping a cheese block illustrated in Figure 13.
Figure 11:
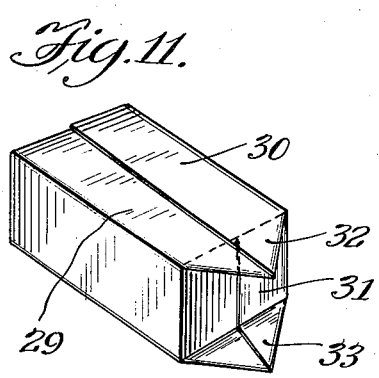
Figure 11 illustrates a block of cheese wrapped with our self-sealing film by another method with the end flaps prior to being folded.
Figure 12:
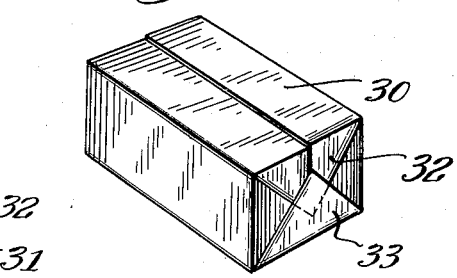
Figure 12 is a view of the same cheese package illustrated in Figure 11 with the end flaps folded over into final position.

Any other suitable method may be employed for ensuring the complete enfoldment and sealing of the cheese within the flexible wrapper. The manner of wrapping the pressure sealable film about the cheese may be greatly varied provided the cheese is completely wrapped. For example Figures 11 and 12 illustrate a method of enclosing the ends of the cheese by first folding over the longitudinal portions 29 and 30 of the film over the end 31 of the cheese thereby forming extending triangular flaps, 32 and 33, which are then folded over in overlapping relation as shown in Figure 12. The film may also be first brought into longitudinal contact as shown at 35 in Figure 13 and then folded over the cheese as shown in Figure 14. The ends are then wrapped in any suitable manner.

A cheese package prepared according to our invention is ready to be marketed directly after being removed from the curing room. By using suitable aniline or oil base inks it is possible to print prior to the packaging operation, brand names or other identifying marks on the wax-rubber sheets so that no further packaging is necessary. The wrapper may also be embossed or marked in any other suitable manner with indicia 25 identifying the manufacturer as shown in Figure 10. When desired the cheese may be placed in a carton as in the case of a butter package.

The use of wax-rubber sheets for packaging American cheese according to this invention accomplishes several results. It permits the wrapping of the cheese at the time of manufacture, since suitable curing will take place in the package. It eliminates the formation of rind on the surface of the cheese due to the fact that the loss of moisture is very much less than with the method heretofore used. It prevents the formation of mold on the cheese, thereby eliminating later cleaning of the cheese. It will produce a package of convenient size and shape so well identified that the customer may then repeat purchases by brand name or grade.

It is obvious that many variations and alterations may be made in carrying out our packaging procedure. For example instead of forming a large green cheese and then cutting it into smaller pieces we may utilize a hoop having partitions so as to produce cheeses of the desired size thereby eliminating the cutting step. This method is particularly feasible when larger sized cheeses, say weighing 5 lbs. or more are desired. After a cheese is so formed it is packaged in a similar manner as that used for cut cheese pieces.

The enclosing film we use adheres to the cheese surfaces at all times even during a slight contraction or expansion thereof, as well as during the ripening period. Although it is well known that gases are generated when cheese ripens, the film used does not ordinarily bulge or separate from the surfaces of the cheese as a result of this gas generation, because the film permits the escape of these gases. Apparently the gases are absorbed or dissolved by the film as quickly as they are generated at the surface of the cheese and are then given off at the outer surface of the film at about the same rate at which absorption occurs.

Inasmuch as our preferred wrapping film is translucent it is possible to ascertain the color, condition, texture and other characteristics of the enclosed cheese. We may however add any desired pigment to our film composition so as to produce colored and opaque wrapping sheets. Furthermore our wrapper is readily peelable from the surface of the cheese and can be removed easily without having any cheese cling thereto. Since the wrapper is moisture- and waterproof no rind forms on the surfaces of the cheese, as practically no moisture escapes from the package.

After considerable experimentation we have found it is also possible to print the enclosing film with trade-marks or other indicia to indicate source of manufacture of the cheese. Our wax-rubber sheets may be printed with aniline inks or special oil inks of any desired color. The cheese wrapped with such printed films can therefore be sold as originally packed without requiring any further packaging.

The method of packaging small units of cheese according to this invention thus offers a highly economical and much sought for procedure which has not been heretofore possible.

The cheese package prepared according to our invention may be stored for many weeks without drying out, deterioration or loss of texture and flavor. The package is highly attractive in appearance, convenient to handle, distribute and market. It is possible to package units of various sizes depending upon the market demands, ranging from sizes of ½ lb. to larger sizes suitable for hotels and clubs or for retail stores to cut into smaller quantities.

From the viewpoint of sanitary handling, the cheese package made according to the invention offers advantages as the contamination of the cheese is obviated, since from the time the cheese is manufactured to the time it reaches the ultimate consumer it is positively sealed and is protected against all sources of contamination.

It is to be understood that our method of packaging cheese is applicable to all varieties of cheese, whether uncured or cured. Although our specific example relates to the packaging of green cheese we may cut large ripened cheese into smaller pieces and package them in accordance with our method. We may also package cold and hot processed cheese in accordance with our invention and by use of film having the proper softening point.

Our invention is also not restricted to any specific type of self-sealing film material. Instead of employing a self-sustaining film material we may coat, support or unite the film material on either one or both sides of any suitable base such as any type of paper, cellophane, cellulose acetate and other similar artificial film material as well as fabrics or metal foils. When using such wrapping materials we apply the wrapper in such manner as to produce an air tight package.

We may also apply a pressure sealable film to the inner surfaces of a carton similar to that used for packaging butter and seal the cheese within such carton by application of pressure, the film being in contact with the surfaces of the cheese.

Numerous details of the package and of the process may be varied through a wide range without departing from the principles of this invention, and we do not therefore propose limiting the patent grant otherwise than as necessitated by the prior art.

We claim:

1. The process of packaging cheese which comprises compressing curd so to form a large green cheese, dividing the cheese into pieces, enclosing the individual pieces of green cheese in a flexible pressure sealing film formed from a wax-rubber composition having an initial viscosity of at least 8000 secs.(Scott viscosimeter at 90° C.), and curing said cheese units therein.

2. The process of preserving and ripening cheese which comprises compressing curd into a hoop so as to form a cheese, dividing the cheese into pieces, enclosing the individual pieces of green cheese in a flexible pressure sealable film formed from a wax-rubber composition having an initial viscosity of at least 8000 secs. (Scott viscosimeter at 90° C.), then wrapping the packages so produced with an outer wrapper, applying pressure to said wrapped units so as to self seal the lapping portions of the wrapper and expelling at the same time any air contained within the package, and then curing said cheese units.

3. The process of packing cheese which comprises compressing curd so as to form a large green cheese, dividing the cheese into pieces, enclosing the individual pieces of green cheese in a film made from a wax-rubber composition comprising from at least 6 to 30% of rubber and having an initial viscosity of at least 8000 secs. (Scott viscosimeter at 90° C.).

4. The process of preserving and ripening cheese which comprises compressing curd into a hoop so as to form a cheese, then cutting the cheese into pieces, enclosing the individual pieces of green cheese in a flexible pressure sealable film formed from a wax-rubber composition having an initial viscosity of at least 8000 secs. (Scott viscosimeter at 90° C.), then wrapping the packages so produced with a sheet of dry waxed crepe paper, applying pressure to said wrapped units so as to self seal the lapping portions of the wrapper and expelling at the same time any air contained within the package, and then curing said cheese units.

5. A process of packaging natural American cheese which comprises the steps of compressing into a hoop an excess amount of curd which it normally receives, pressing the curd in said hoop so as to cause it to conform to the shape of the hoop, dressing the cheese so formed in cloth, then repressing to close up any voids within said cheese, cutting the cheese so formed into smaller units, enclosing said units in a sheet of flexible wax-rubber composition having an initial viscosity of at least 8000 secs. (Scott viscosimeter at 90° C), then wrapping the individual packages with waxed crepe paper, applying pressure to said packages to completely seal the cheese in said rubber-wax sheet, and permitting the cheese so wrapped to cure.

6. The process of packaging natural American cheese which comprises the steps of compressing into a hoop an excess of about 7% of curd over the rated capacity, pressing the curd in said hoop so as to cause it to conform to the shape of said hoop, dressing the cheese so formed in cloth, then repressing the cheese for about 2 hours to close up any voids within said cheese, cutting the cheese so formed into smaller units, enclosing said units in a sheet of wax-rubber composition having an initial viscosity of at least 8000 secs. (Scott viscosimeter at 90° C.), then wrapping the individual packages with waxed crepe paper, replacing the packages within the hoop in the same order as taken out, applying the pressure to said assembled packages from about 8 to 10 hours so as to completely seal the individual cheese units within the wax-rubber sheet, removing the packages from the hoop and permitting the cheese so wrapped to cure.

7. A cheese package comprising American cheese completely enclosed by a superficially adherent, flexible, thermoplastic, stretchable, peelable, pressure sealable sheet of a wax-rubber composition possessing an initial viscosity of at least 8000 secs. (Scott viscosimeter at 90° C.)

8. A cheese package comprising cheese completely enclosed by a superficially adherent, flexible, pressure sealable sheet of a wax-rubber composition having an initial viscosity of at least 8000 secs. (Scott viscosimeter at 90° C.)

9. A cheese package comprising cheese completely enclosed with superficially adherent, flexible, pressure sealable film of a wax-rubber composition having an initial viscosity of at least 8000 secs. (Scott viscosimeter at 90° C.), said film having indicia printed thereon with aniline ink to indicate origin of the manufacture.

10. A cheese package comprising cheese completely enclosed by a superficially adherent, flexible sheet of a wax-rubber composition having from at least 6 to 30% of rubber and having an initial viscosity of at least 8000 secs. (Scott viscosimeter at 90° C.).

11. The process of preserving and ripening cheese which comprises forming a compressed mass of green cheese, completely enclosing said cheese in a sheet made of a wax-rubber composition having an initial viscosity of at least 8000 secs. (Scott viscosimeter at 90° C.), applying pressure to said wrapped cheese to adhere said sheet to the superficial surface of said mass of cheese and to completely seal the cheese within the said sheet, and curing the cheese within the said sheet.

12. The process of protecting cheese from mold growth and loss of moisture which comprises completely enclosing cheese with a pressure sealable sheet made of a wax-rubber composition having an initial viscosity of at least 8000 secs. (Scott viscosimeter at 90° C.), applying pressure to said sheet to bond same to the outer surfaces of the cheese and to seal the cheese within said sheet.

ALLEN ABRAMS.
CHARLEY L. WAGNER.
BENJAMIN F. DAVIS.